United States Patent [19]

Salles

[11] Patent Number: 4,901,098

[45] Date of Patent: Feb. 13, 1990

[54] MATTE BOX AND FILTER ASSEMBLY

[76] Inventor: Roger Salles, P.O. Box 704, Orange, N.J. 07050

[21] Appl. No.: 261,718

[22] Filed: Oct. 24, 1988

[51] Int. Cl.⁴ .............................................. G03B 11/00
[52] U.S. Cl. .................................................. 354/295
[58] Field of Search ............................... 354/295, 296

[56]  References Cited
U.S. PATENT DOCUMENTS

4,687,312 8/1987 Narearro ............................ 354/295

Primary Examiner—Michael L. Gellner
Attorney, Agent, or Firm—Clifford G. Frayne

[57]  ABSTRACT

A matte box and filter assembly for a camera comprising a mounting frame secured to said camera and extending forwardly of the lens, said frame supporting a light shield for engaging the camera lens and a sunshade for shielding light entering the lens, a plurality of interchangeable filters selectively positioned between said light shield and sunshade, the plurality of filters rotatably interconnected with successive filters and individually, selectively slidable, perpendicular to the axis of the lens.

12 Claims, 10 Drawing Sheets

MATTE BOX AND FILTER ASSEMBLY

FIELD OF INVENTION

This invention relates to a matte box which incorporates a camera filter holding system for use on any film or video cameras which camera filter holding system can be fitted to any film or video camera without adaptors.

BACKGROUND OF THE INVENTION

In the professional motion picture industry, the cinematographer often desires to film a scene using a variety of filters or polarizers in order to achieve a desired cinema-graphic effect. Professional motion picture cameras are expensive pieces of apparatus which require careful handling and since substantial investment is required to produce a motion picture, the associated apparatus for use with a professional motion picture camera must be of sufficient quality to ensure the desired result and justify the monies involved.

The advent of technology and micro-chip technology has resulted in a tremendous interest and use of video cameras being purchased and used by individuals and smaller advertising agencies. Thus, a great deal of videotape is being filmed on quality video cameras which vary greatly in their size and dimensions. Nevertheless, while these video cameras are a great deal less expensive than the professional motion picture cameras used to film motion pictures for showing on television or in the theater, these video cameras are nevertheless capable of producing a high quality product for home use, limited distribution or for use on local cable networks.

There is therefore, a need for a matte box and camera filter holding system which can be used by any of these video cameras or professional film cameras and which can be bought and used by any of these cameras and which can be bought and used without the need for any expensive adaptors. The camera filter holding system and matte box assembly which is the subject matter of this application provides such a system for the amateur motion picture photographer, the professional advertiser and the system is even capable of being used with the expensive motion picture cameras more commonly associated with major motion pictures and television films.

The camera filter holding system and matte box assembly provides an easy mounting method for any video or film camera and allows the user the option for utilizing as many filters or polarizers as desired in a simple and easily interchangeable manner.

OBJECTS OF THE INVENTION

It is an object of the present invention to provide a matte box and camera filter holding system for film or video cameras which comprises modular filter stages, any number of which can be used in series depending upon the user's needs.

It is a still further object of the present invention to provide a novel camera filter holding system and matte box assembly to provide a mounting method adaptable to any size film or video camera which permits the use of the camera filter holding system and matte box assembly on a tripod or in a hand-held manner.

It is a still further object of the present invention to provide a novel camera filter holding system and matte box assembly which permits the full rotation of the filter modular stages and to provide slidable characteristics for individual filters.

It is a still further object of the present invention to provide a novel camera filter holding system and matte box assembly wherein the filter holders provide a novel locking mechanism providing the interchangeability of filters by holding the filters on their edges without need to contact the surface of the filters.

It is a still further object of the present invention to provide a novel camera filter holding system and matte box assembly which provides a novel adjusting system permitting the rotation or slidability of the filter stages through the use of one adjusting knob.

SUMMARY OF THE INVENTION

A matte box and filter assembly for a camera having a lens, the assembly comprising a mounting frame connected to and supported from the camera extending forwardly from the lens, a light shield for engaging the camera lens and a sun shade for shielding the light entering the lens, with a plurality of interchangeable filter means selectively positioned between the light shield and the sun shade, the filter means interconnected with successive filter means, the plurality of filter means selectively rotatable with each other and selectively slidable perpendicular to the axis of the lens.

BRIEF DESCRIPTION OF THE DRAWINGS

A better understanding of the present invention as well as other objects and advantages thereof will become apparent upon consideration of the detailed disclosure thereof, especially when taken with the accompanying drawings where.

DETAILED DESCRIPTION OF THE DRAWINGS

Figure 1:
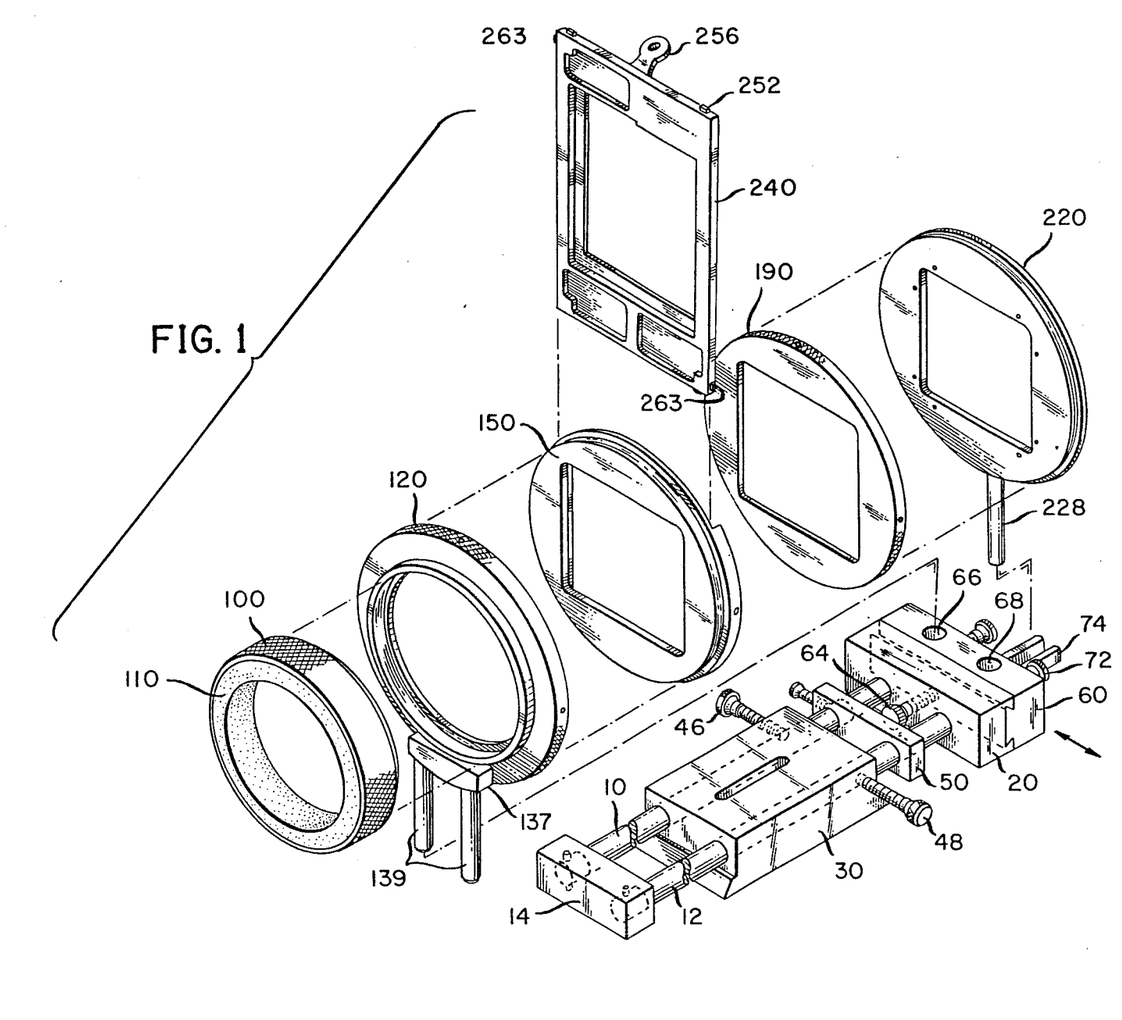
FIG. 1 is a side exploded view of the matte box and filter assembly.
Figure 2:
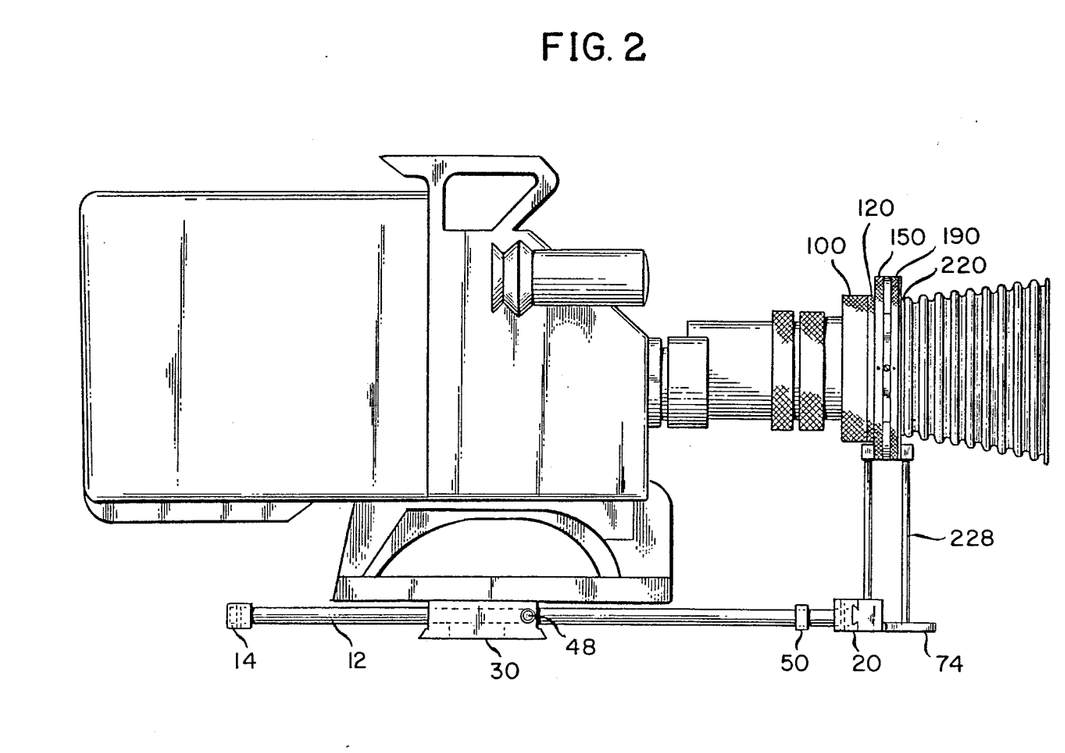
FIG. 2 is a side view of the matte box and filter assembly.

FIGS. 1 and 2 show a side view and a side exploded view of the matte box and filter assembly of the subject invention. It will be better understood after first considering its component parts.

Figure 3:
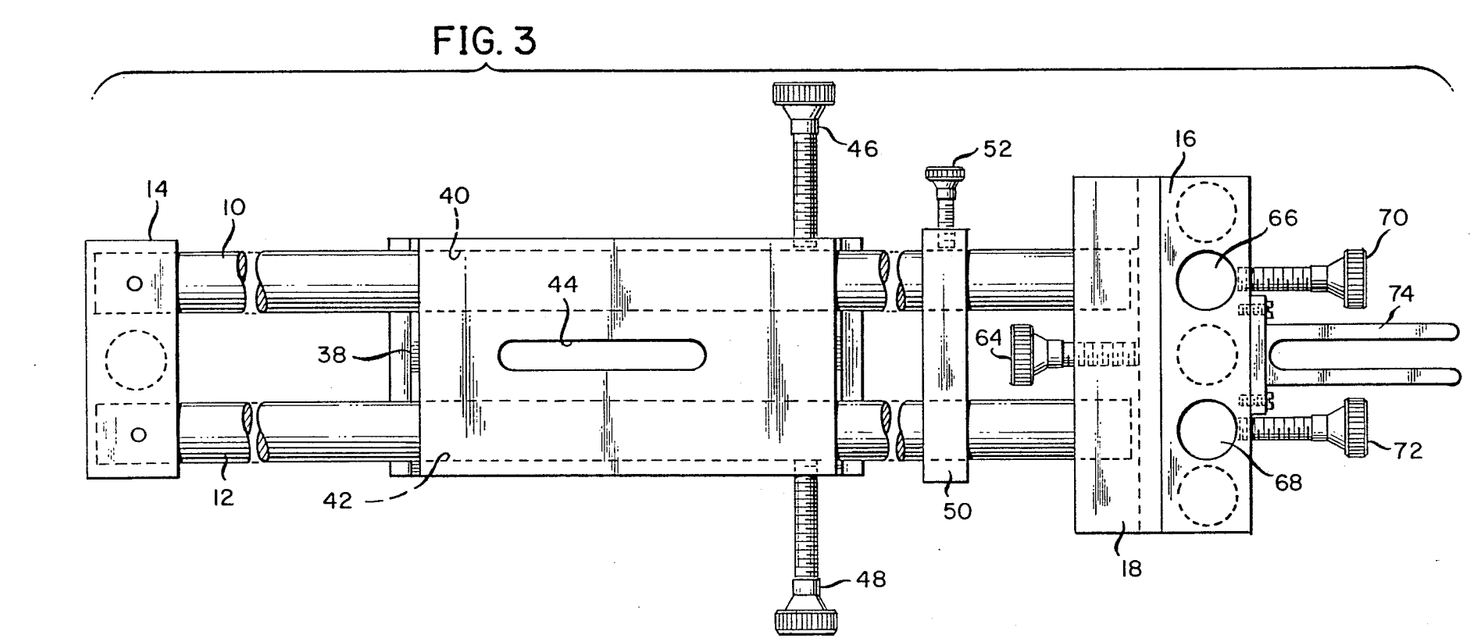
FIG. 3 is a top view of the matte box and filter assembly mount.
Figure 4:
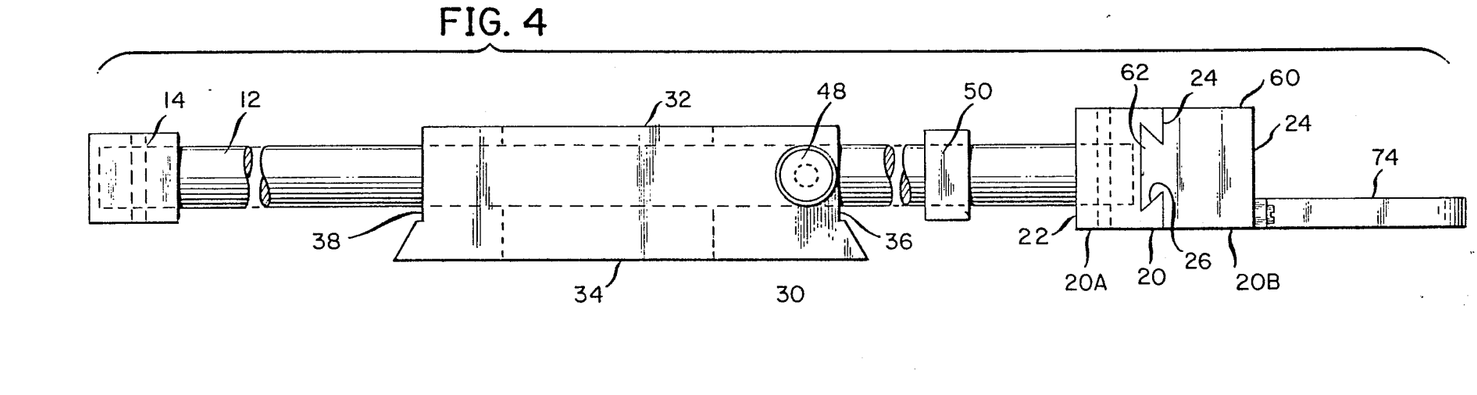
FIG. 4 is a side view of the matter box and filter assembly mount.

In considering FIGS. 3 and 4, there is shown a top view and side view of the matte box and filter assembly mount. The mount comprises two parallel tracks 10 and 12 which are secured at one transverse end by a back stop 14 which comprises a rectangular plate of sufficient dimension in order to secure the transverse ends of tracks 10 and 12. The opposite transverse ends of tracks 10 and 12 are secured in a junction block 16. Junction block 16 is of a rectangular configuration having a planer top surface 18, a planer bottom surface 20, a planer back surface 22, and a planer front surface 24, having a dove-tail cut 26 longitudinally transversely positioned therein to be discussed hereafter. In this configuration, longitudinal tracks 10 and 12 are positioned in parallel alignment between back stop 14 and junction block 16.

Slidably secured to tracks 10 and 12, is camera plate 30. Camera plate 30 comprises a substantially rectangular plate having upper planer surface 32, a lower planer surface 34, and planer end surfaces 36 and 38. Passing through camera plate 30 are parallel longitudinal apertures 40 and 42 to accommodate parallel tracks 10 and 12. In this configuration, camera plate 30 is slidably mounted on tracks 10 and 12, the slidable disposition of camera plate 30 being limited by back stop 14 and junction block 16.

Camera plate 30 has an elongated aperture 44 positioned through camera plate 30, elongated aperture 44 being positioned between apertures 40 and 42 and being vertically disposed between horizontal upper surface 32 and horizontal lower surface 34. Elongated aperture 44 is for the accommodation of the securing means for the mounting of a camera (not shown) on camera plate 30.

As can further be seen with reference to FIG. 3, camera plate 30 may be secured to any selected position between back stop 14 and junction block 16 by means of a pair of thumb screws 46 and 48 which are threadedly secured through the sidewalls of camera plate 30 and positioned such as to frictionally engage tracks 10 and 12 respectively.

In this general configuration, the video camera would be mounted on camera plate 30 with the lens of the camera positioned in the direction of junction block 16. Additionally, there is a front stop 50 which is engaged with tracks 10 and 12 and slidably secured to tracks 10 and 12 by means of a thumb screw 52 so as to preset the limit of forward movement of camera plate 30. This allows the operator to slide the camera away from the filter assembly described hereafter and to then return the camera and camera plate to a preset position without inadvertently having the camera lens contact the filters and possibly cause damage to them.

Junction block 16 comprises the means for positioning the various filters and polarizers. Directing our attention to FIGS. 3 and 4, to the junction block assembly 16, it can be seen that it is comprised of two elements, a female dove-tail block 20A and a male dove-tail block 20B. Junction block 16 is secured to tracks 10 and 12 by means of female dove-tail block 20A to define the amount of displacement of camera plate 30. Dove-tail cut 26 in front face 24 of female dove-tail block 20A is designed to accommodate male dove-tail block 20B. Male dove-tail 62 is slidably engageable with dove-tail slot 26 in female dove-tail block 20A. In actual operation, this permits filter alignment as will be discussed hereafter by the horizontal sliding of male dove-tail block 20B and filter holding assembly 60 within dove-tail 26 in junction block 20. A threaded thumb screw 64, passes through an aperture from the rear face 22 of female dove-tail block 20A to frictionally engage an internal groove on male dove-tail block 20B to secure filter assembly 60 in a desired position and prevent it from inadvertently sliding out of the female dove-tail groove.

Male dove-tail block 20B has a pair of vertical apertures 66 and 68 positioned therethrough and a corresponding set of threaded thumb screws 70 and 72 passing from front face 24 of male dove-tail block 20B, perpendicular to apertures 66 and 68. Apertures 66 and 68 provide for the vertical displacement of the filter holding assembly 60 which secures the filter and polarizers.

Mounted on the front face of male dove-tail block 20B is a fork assembly 74 which fork assembly is designed to accommodate a sun shade for the entire filter assembly as will be discussed hereafter. As will become evident after a description of the filter polarizer assembly, the mounting of the sun shade on fork 74 permits the operation and changing of the filter assembly without disrupting the sun shade. Alternatively, the fork assembly may be replaced by a projecting arm having an aperture for receipt of the sun shade support.

The filter assembly for holding the various filters and polarizers comprises a doughnut ring, coupled to a back ring, coupled to a ring body and ring cover which carries the filter or polarizer, and then coupled to another ring body and ring cover for as many filters or polarizers as the operator desires. See FIGS. 1 and 2. The discussion hereafter will be directed to each individual item of the assembly and then to the assembly itself.

Figure 5:
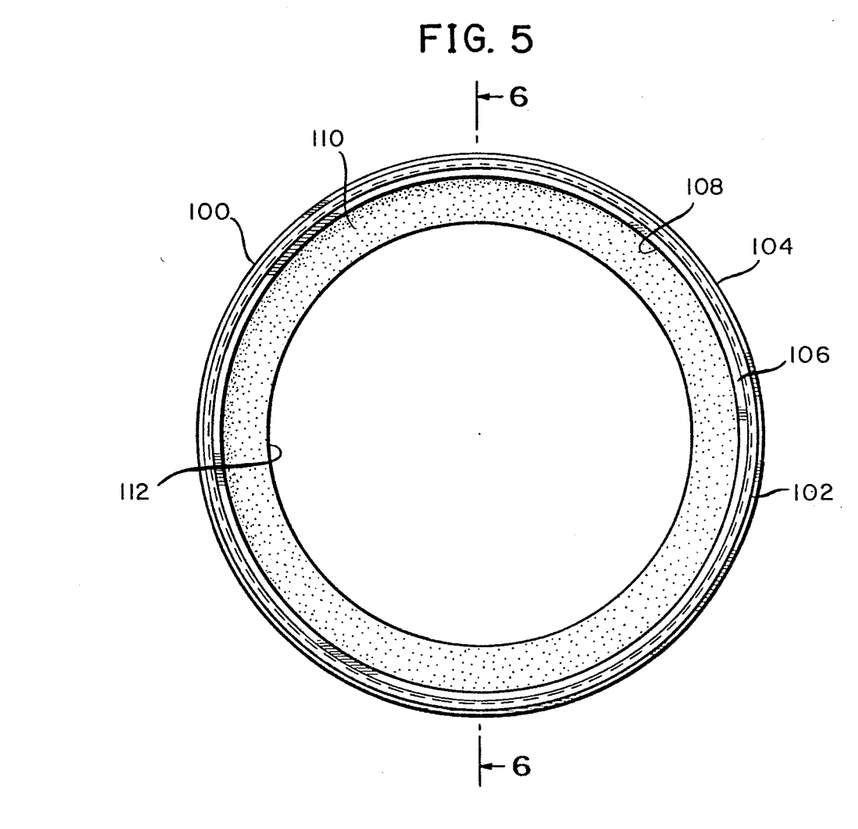
FIG. 5 is a front view of the camera lens engaging doughnut ring.
Figure 6:
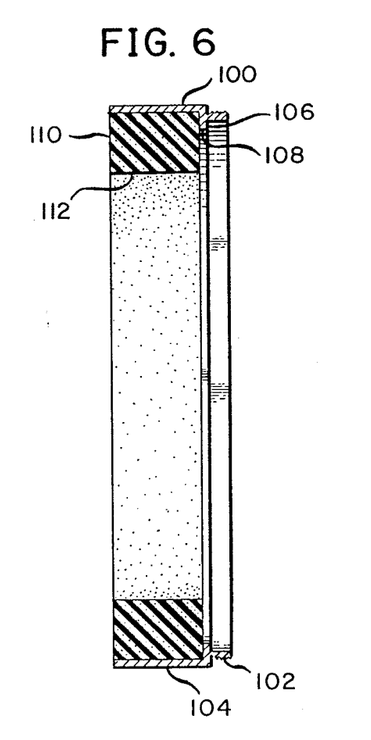
FIG. 6 is a side cutaway view of the camera lens engaging doughnut ring.

Referring to FIG. 5, there is shown a front view of the doughnut ring 100. FIG. 6 comprises a side, cross sectional cutaway view of doughnut ring 100. Doughnut ring 100 is circular in cross sectional area having front threaded circumferential surface 102 slightly circumferentially indented from outer planer circumferential surface 104. Positioned between outer planer circumferential surface 104 and indented threaded surface 102 is an internal annular flange 106. Doughnut ring 100 thereby defines aperture 108, the narrowest portion thereof defined by indent flange 106.

Doughnut ring 100 is mounted on filter holding assembly 60 and junction block 20 in a most rearward position with threaded annular circumferential surface 102 facing forward towards fork 74. Doughnut ring 100 is designed to accept the lens of the video camera mounted on camera plate 30. Doughnut ring 100 is designed to accommodate a foam doughnut-shaped insert 110 which can have a varying aperture 112 therethrough. Foam insert 110 is frictionally engaged in doughnut ring 100 by slipping it through doughnut ring 100 until foam insert 110 engages interior indented flange 106. In this configuration, this permits the operator to adjust the video camera mounted on camera plate 30 forward to front stop 50 until the lens system engages foam insert 110 by either sliding into aperture 112 or engaging the inner annular edge of aperture 112 thus providing a light shield for the camera lens and the remaining filter assembly.

Figure 7:
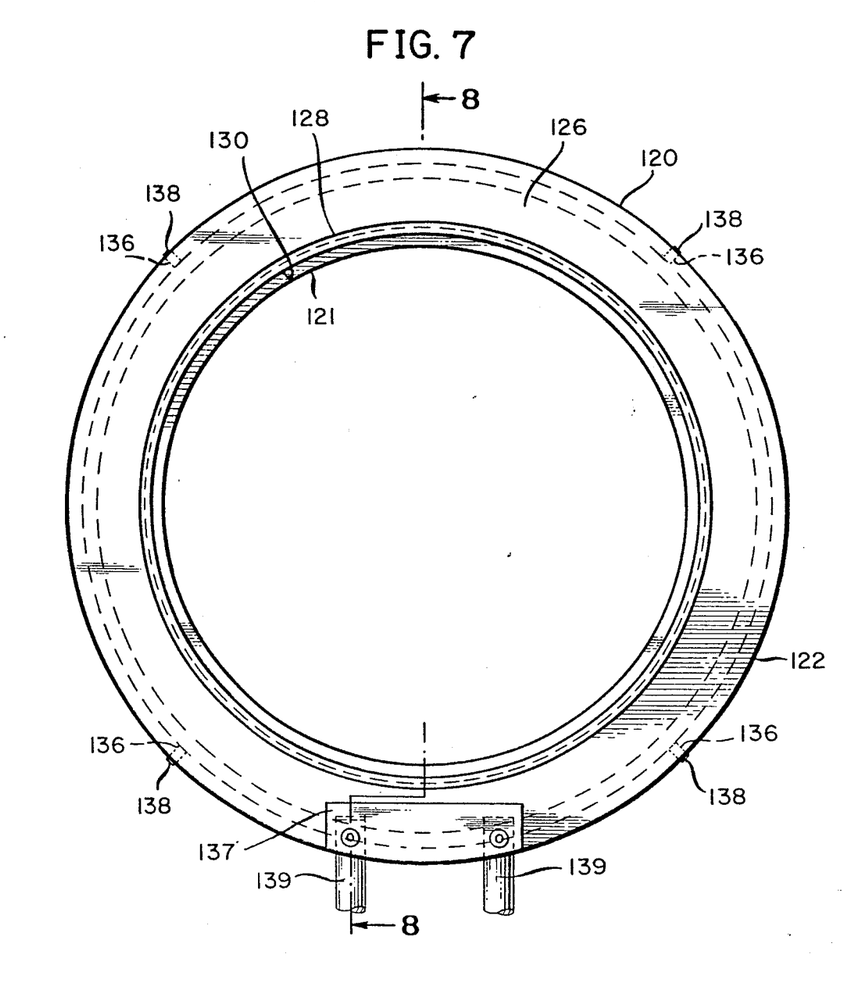
FIG. 7 is a back view of the backing ring.
Figure 8:
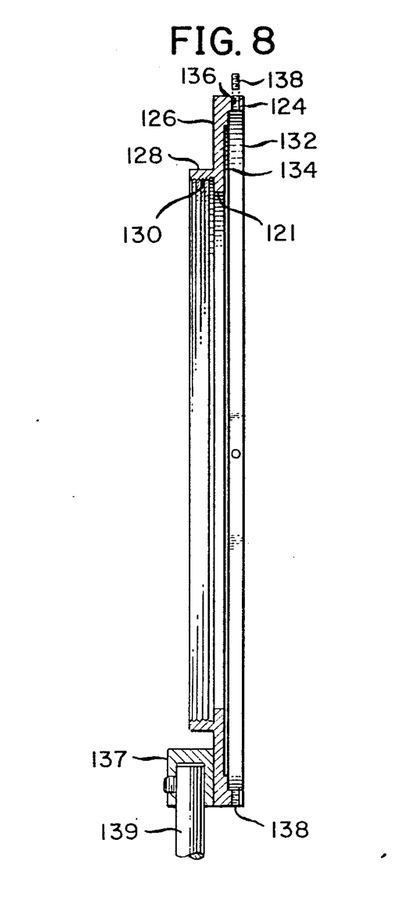
FIG. 8 is a side partial cutaway view of the backing ring along axis 8—8.

Referring next to FIGS. 7 and 8, there is shown a back view and a side partial cutaway view of the back ring assembly. The back ring 120 is circular in cross sectional area having an outer circumferential planer surface 122, having a front, vertical, planer, circumferential annular surface 124 and a rear planer, vertical, circumferential annular surface 126. Depending outwardly from rear planer circumferential annular surface 126 is an annular lip 128 having internal threads 130 designed to be complimentary and to cooperate with the external threads on doughnut ring 100 in order to secure back ring 120 to doughnut ring 110. Rear planer circumferential annular surface 126 extends radially inwardly from threaded annular surface 132 to serve as a stop for the securing mechanism and to define aperture 121.

As can be seen from FIG. 7 and FIG. 8, the front surface of back ring 120 steps inwardly, radially from front circumferential, vertical, annular, planer surface 124 to aperture 121. First annular circumferential planer surface 132 is stepped slightly higher than second planer annular circumferential surface 134 and back ring 120. There is positioned through outer circumferential annular surface 122, a plurality of set screw openings 136. In the configuration shown in FIGS. 7 and 8, these openings 136 are positioned ninety degrees apart. These threaded openings are designed to accommodate ring coupling screw 138 in order to rotatably secure the ring body hereinafter described, to back ring 120. Back ring 120 has a mounting block 137 secured to face 126 for securing back ring 120 to male dove-tail block 20B. Two downwardly depending rods 139 secured to mounting block 137 are slidably engageable in apertures 66 and 68 in male dove-tail block 20B.

Figure 9:
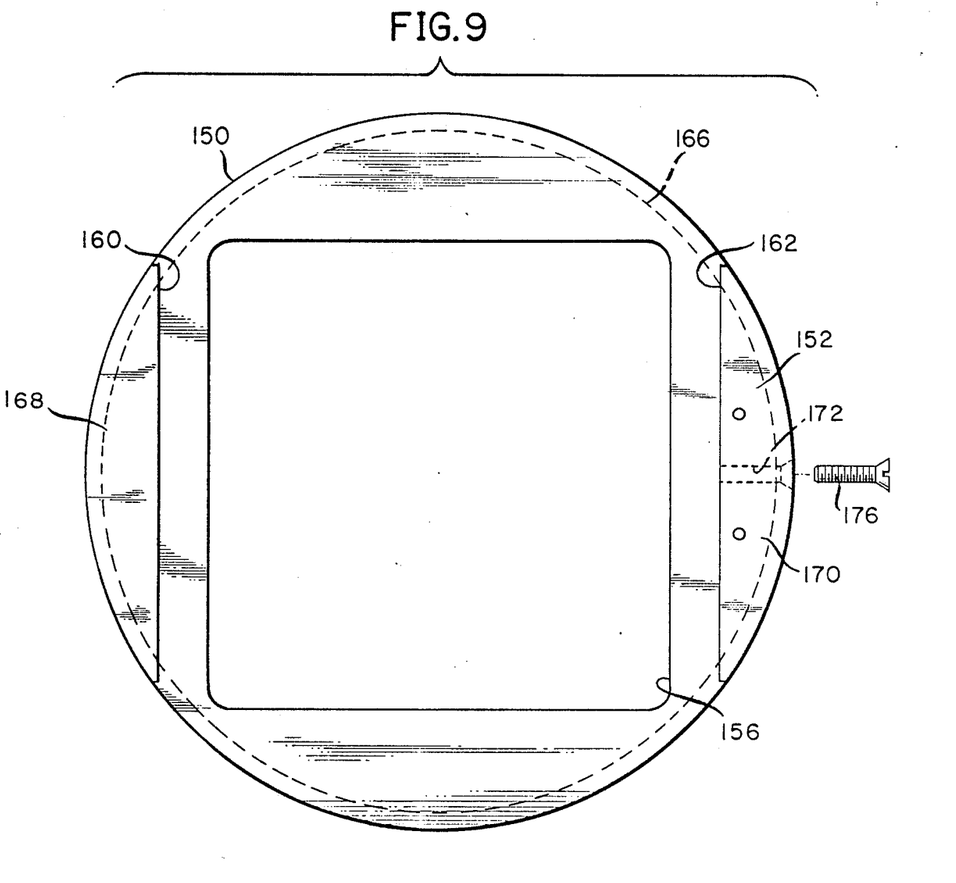
FIG. 9 is a front view of the ring body.
Figure 10:
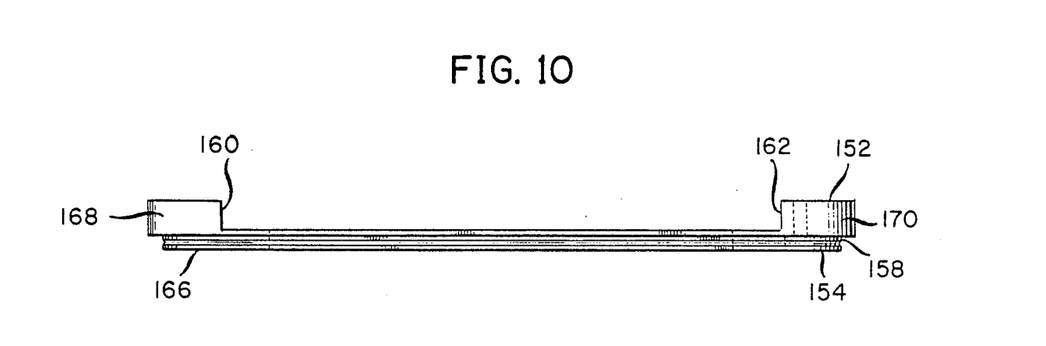
FIG. 10 is a side view of the ring body.

Referring now to FIG. 9 and FIG. 10, there is shown a front view and a side view of ring body 150. Ring body 150 comprises that part of the apparatus which actually secures the filter or polarizer in the assembly in cooperation with the ring cover. Ring body 150 is circular in cross sectional area having a front face 152 and a rear face 154. A substantially Countersink aperture 172 extends from outer planer surface 168 or 170 to inner channel surface 160 or 162 to further cooperate with the filter or polarizer as described hereafter.

Figure 11:
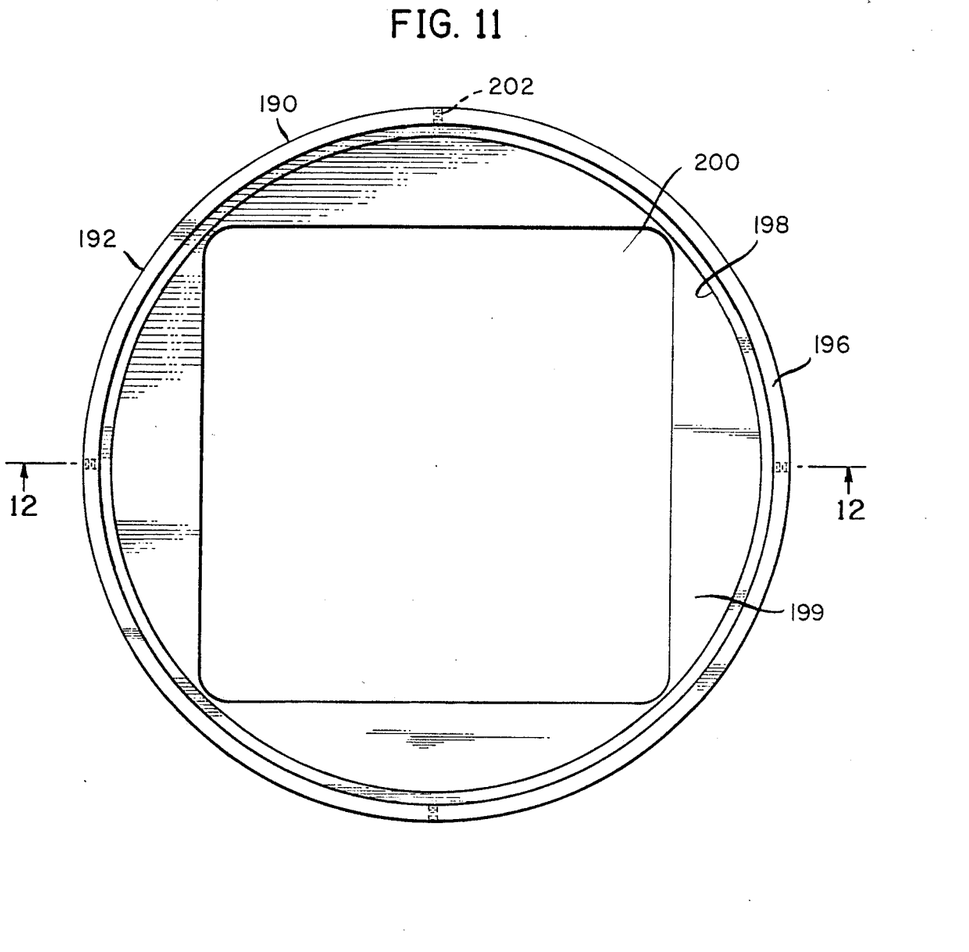
FIG. 11 is a front view of the ring cover.
Figure 12:
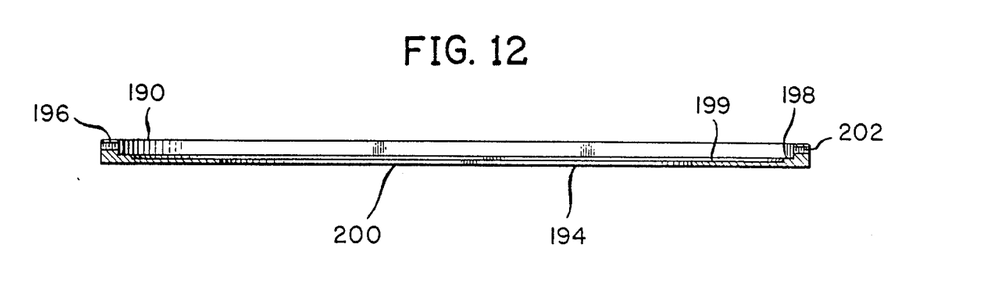
FIG. 12 is a side view of the ring cover along axis 12—12.

Referring now to FIGS. 11 and 12, there is shown a front view and a side cross sectional view of ring cover 190. Ring cover 190 is circular in cross sectional area having an outer circumferential planer surface 192, a substantially planer back surface 194, an annular circumferential planer front surface 196, a recessed annular planer surface 198 disposed between annular circumferential front surface 196 and front face 199 of circular planer rear surface 194. Ring cover 190 has disposed centrally therethrough, substantially rectangular aperture 200 for alignment with aperture 156 in ring body 150. There is disposed in ring cover 190, a plurality of apertures 202 extending from outer planer circumferential surface 192 to the interior wall of annular planer circumferential surface 196. Apertures 202 are for the accommodation of set screws in order to accommodate the positioning of another ring body 150 in front of ring cover 190. In the configuration shown, there are four apertures 202 positioned ninety degrees apart about ring cover 190.

In this configuration, a second ring body 150 would be rotatably secured to ring cover 190 in order to accommodate another filter or polarizer. The alternating of a ring cover and a ring body would continue to accommodate as many filters or polarizers as the operator wished to place in series in front of the camera lens. Ring cover 190 is secured to ring body 150 by a series of set screws such that rear surface 194 is secured to front surface 152 on ring body 150 thereby defining channel 160 for the receipt of a filter. rectangular aperture 156 positioned through ring body 150 in substantial alignment with aperture 121 in back ring 120 for alignment with the filter and polarizer assembly as will be discussed hereafter.

Rear face 154 of ring body 150 comprises a mounting mechanism for ring body 150. Rear face 154 comprises an annular U-shaped circumferential indent 158 designed to align with set screw openings 136 in back ring 120 such that when set screws are secured through openings 136 in back ring 120, they will engage annular U-shaped opening 158 sufficiently to secure ring body 150 in position, but to allow it to rotate in a 360 degree arc.

Front face 152 of ring body 150 comprises the slidable mounting arrangement for the filter or polarizer. Front face 152 of ring body 150 is wider than rear face 154 and has positioned therethrough substantially centrally positioned rectangular channel defined by sidewall cuts 160 and 162. Sidewall cuts 160 and 162 define channel 166, channel 166 being for the receipt of the filter or polarizer holder.

The design of ring body 150 and, in particular front face 152, provides for partial circumferential planer sidewall surface 168 and 170. Positioned through one of these sidewall surfaces 168 or 170 is countersink aperture 172 whose longitudinal central axis is positioned such that the outer circumference of countersink aperture 172 extends beyond planer circumferential surface 168 or 170. In this configuration, when ring body 150 is mounted on back ring 120, rotatably secured by set screws 138 through apertures 136, set screw 176 secured through aperture 172 will frictionally engage circumferential annular surface 122 of back ring 120 in order to fix the rotational disposition of ring body 150 and hence the filter or polarizer contained therein.

Figure 13:
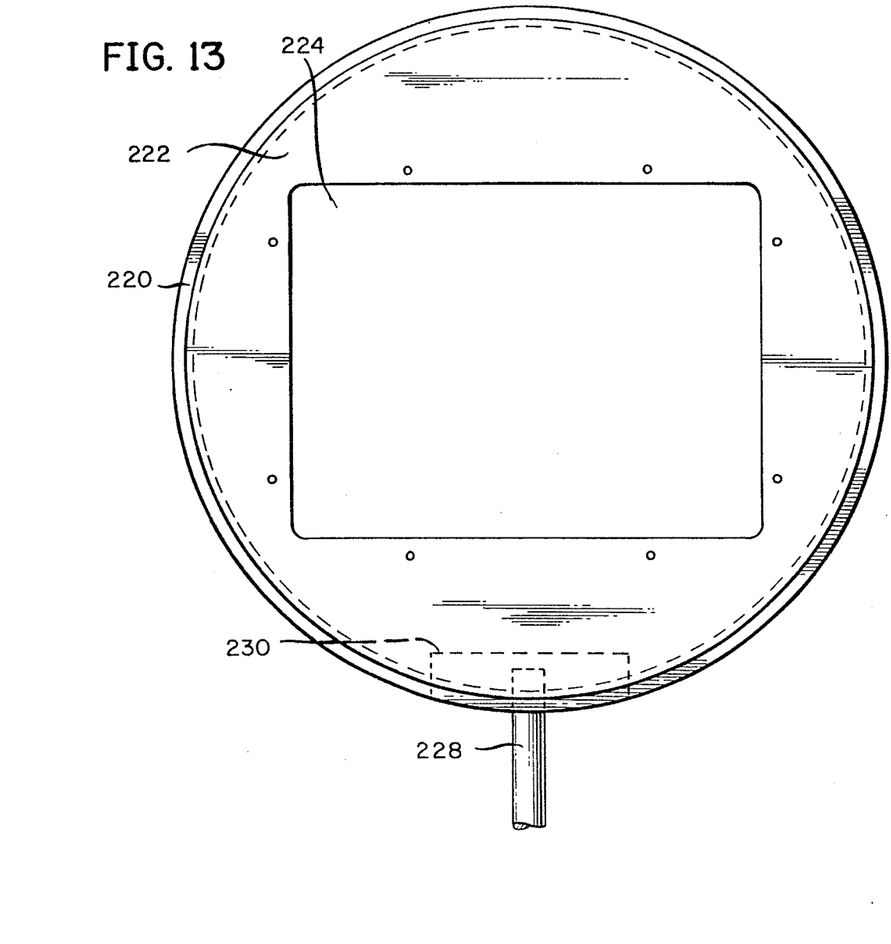
FIG. 13 is a front view of the front ring.
Figure 14:
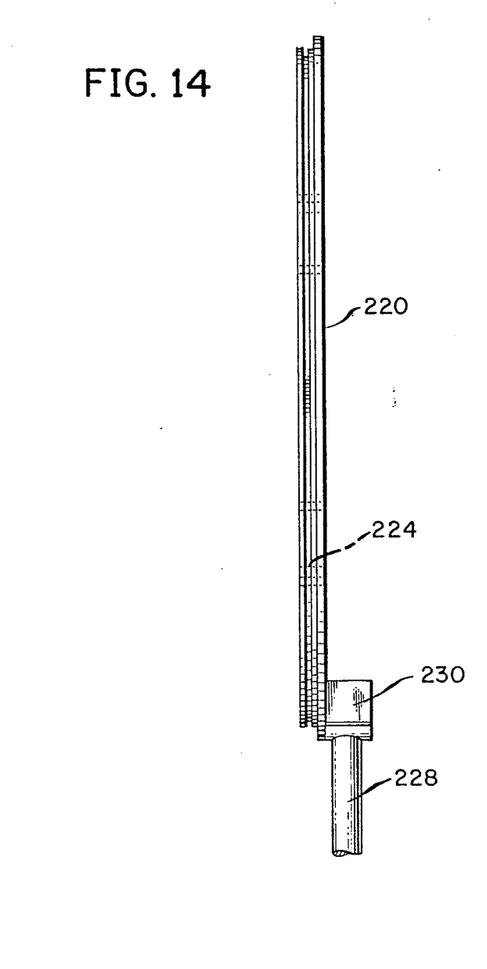
FIG. 14 is a partial cutaway view of the front ring along axis 14—14.

Referring now to FIGS. 13 and 14, there is shown a front view and a side partial cutaway view of a front ring 220. Once the operator had positioned as many ring covers and ring bodies as is necessary to accommodate the number of filters or polarizers desired, the operator concludes the series with a ring cover 190 to which front ring 220 would be secured. Front ring 220 is circular in cross sectional area having a front planer surface 222 having centrally positioned thereon, a substantially rectangular aperture 224 for alignment with the apertures in ring cover 190 and ring body 150.

Front ring 220 has a U-shaped annular indent 224 positioned behind front planer surface 222, U-shaped annular indent 224 being similar to the indent in ring body 150. Annular indent 224 permits front ring 20 to be secured to ring cover 190 by means of set screws positioned through apertures 202.

Once the operator has positioned the necessary ring bodies in series to accommodate the number of filters required, the front ring would be secured to the forward most ring cover and sun shade which would be mounted on fork 74 of junction block 16. Front ring 220 has a vertical mounting shaft 228 secured to mounting block 230 on planer surface 222. Mounting shaft 228 engages fork 74 so that front ring 220 and the sun shade do not rotate as the operator rotates the ring bodies, ring covers and associated filters.

Figure 15:
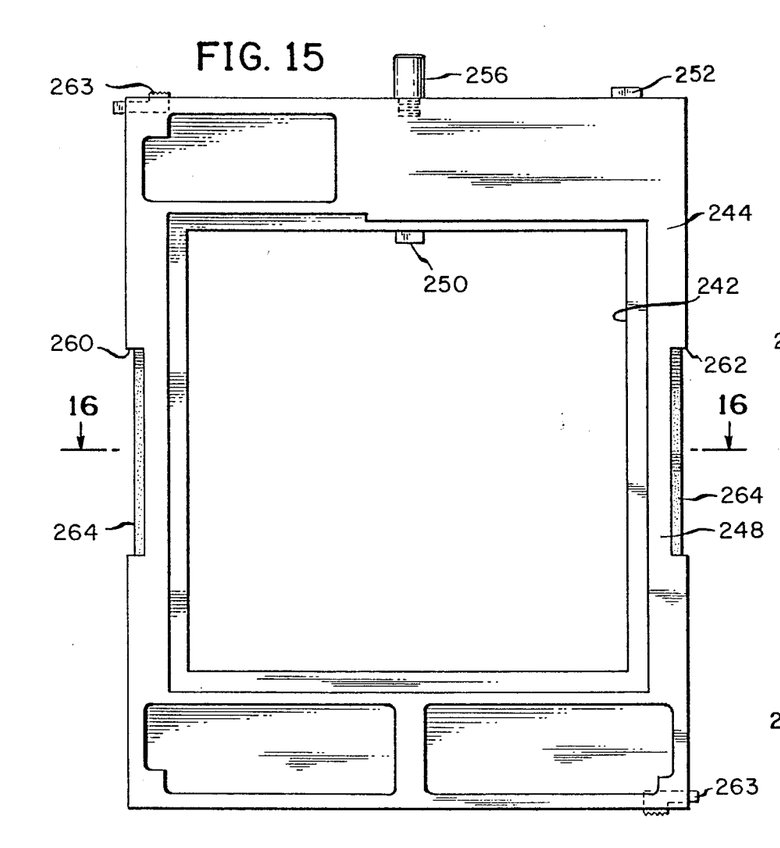
FIG. 15 is a front view of the filter holding body.
Figure 16:
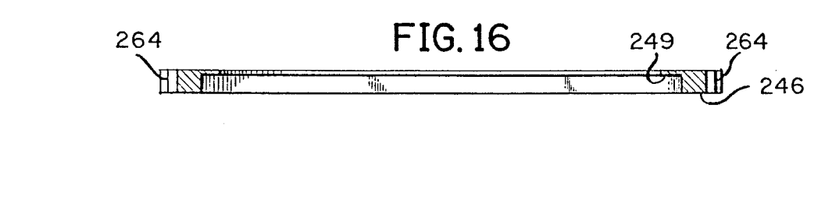
FIG. 16 is a top partial cutaway view of the filter holding body along axis 16—16.
Figure 17:
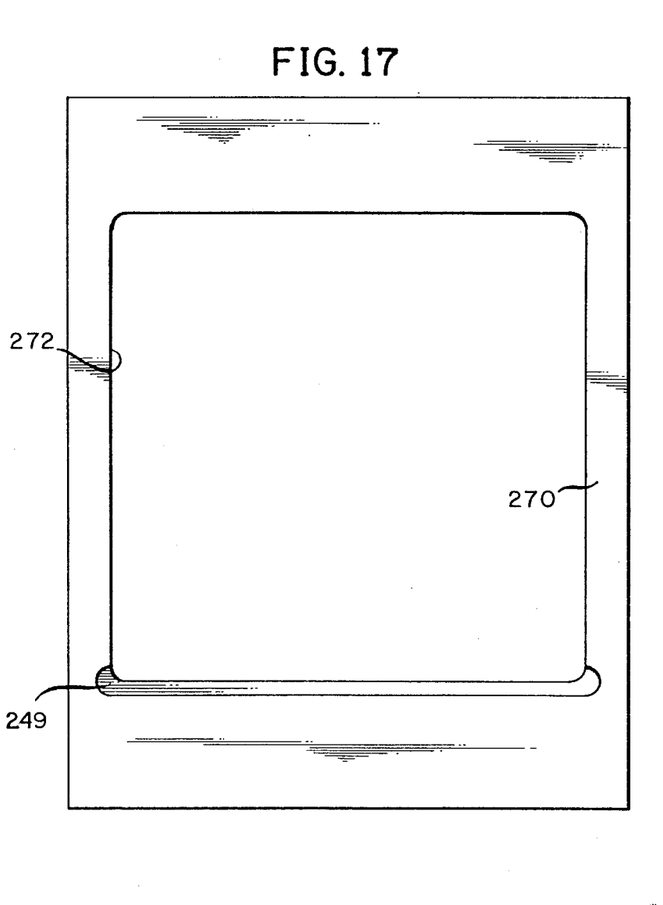
FIG. 17 is a front view of the filter cover plate.

Referring now to FIGS. 15 and 16, there is shown respectively, a front view and a top view of the filter holder body. Filter holder body 240 is generally rectangular in cross sectional area having a rectangular aperture 242 positioned centrally thereon. When the filter holder body is positioned in the apparatus, aperture 242 is in general alignment with the apertures in the doughnut ring, back ring, ring body, and front ring. Filter holder body 240 has a generally planer front face 244 and a generally planer back face 246 and a recessed planer flange 248 about aperture 242. Referring to FIG. 17, there is shown a front planer view of the filter holding body cover plate 270 which conforms to the cross sectional configuration of filter holder body 240 and is secured thereto. Aperture 272 in cover plate 270 aligns with aperture 242 cooperating with recessed planer flange 248 and defining a groove 249 for the acceptance of a lateral edge of the filter for ease of insertion. In this configuration, a filter or polarizer is placed in filter holder body 240 by placing it so its outer edges correspond with planer flange 248. Filter holder knife 250, which is spring and/or lever operated by means of a compression button 252 at the top of filter holder body 240 secures the filter or polarizer in position and also permits the removal of the filter or polarizer such that fingerprints or the like would not be placed upon the filter or the polarizer. Filter holder body has a handle 256 secured to the top of the filter holder body to aid the operator in inserting the filter holder body into channel 160 in the ring body defined by sidewalls 160 and 162 and ring body circular planer surface 166 and the secured cover ring secured to the front of ring body 150.

Positioned centrally along the sides of filter holder body 240 are two longitudinal indents 260 and 262. Longitudinal indents 260 and 262 have secured thereto, a strip of Neoprene or other resilient material 264. In this configuration, filter holder body 240 with the filter or polarizer secured therein, is inserted into channel 160 as defined in ring body 150. Once positioned such that the apertures are in alignment, countersink screw 176 is secured through countersink aperture 172 in ring body 150 such that the end of countersink screw 176 contacts the neoprene strip 264 in longitudinal indent 262 of filter holder body 240. This secures filter holder body 240 and the filter in position in the entire apparatus. It will be noted that countersink screw 176 also secures the rotational integrity of ring body 150 as previously explained. If it is desired to rotate ring body 150, countersink screw 176 is loosened slightly so that its frictional engagement with back ring 120 is released and ring body 150 can then be rotated to the desired position. The release of frictional engagement by releasing countersink screw 176 is accomplished by use of the neoprene resilient strip 264 such that filter holder body 240 is still maintained in position. Additionally, longitudinal indents, 260 and 262, in the edge of filter holder body 240 will engage countersink screw 176 to prevent filter holder body 240 from falling or passing completely through channel 160 possibly damaging the filter or the polarizer yet allows vertical displacement of the filter while still maintaining its light trap characteristics. An additional safety feature to prevent the filter or polarizer from inadvertently being disclosed from the assembly are two slidable set pins 263 which are selectively manually engageable and which will engage the ring body to prevent the filter holder assembly from falling out.

Figure 18:
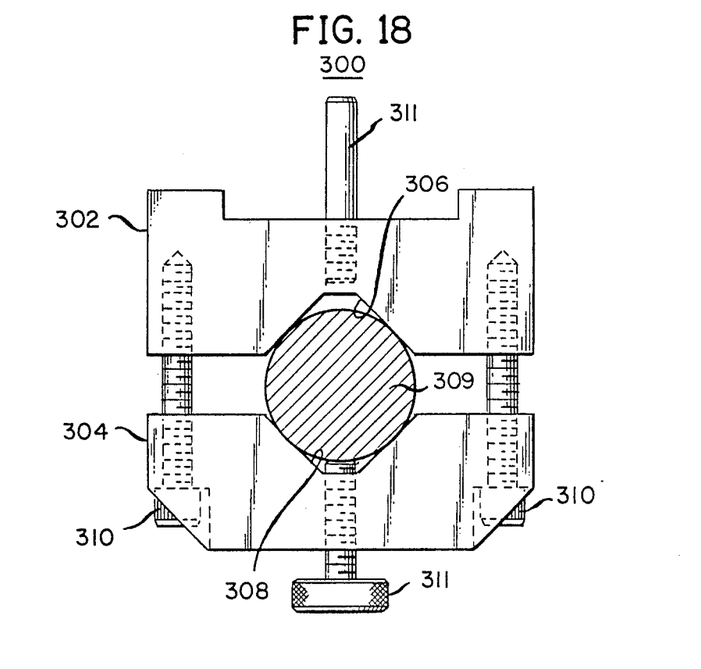
FIG. 18 is a front view of a second embodiment attachment means.
Figure 19:
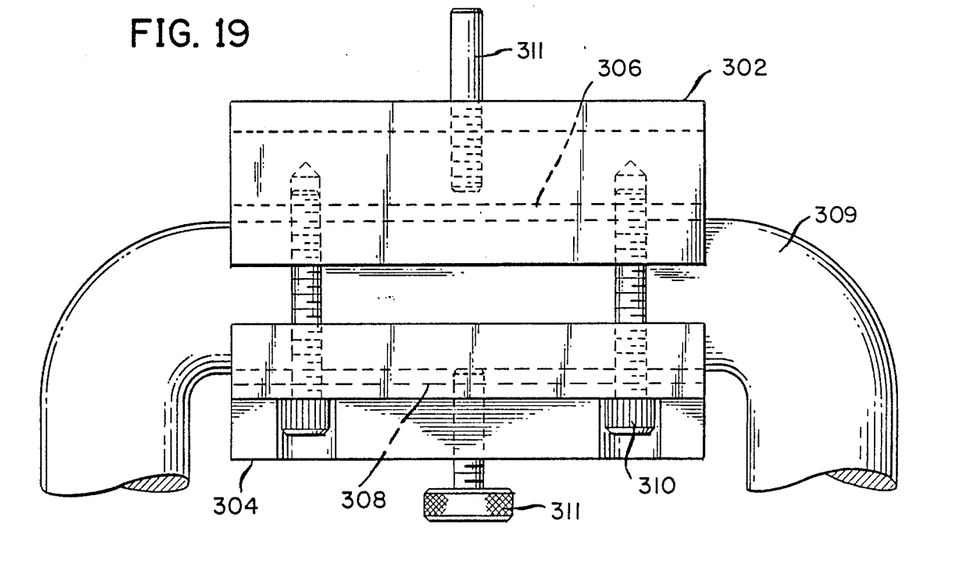
FIG. 19 is a side view of a second embodiment attachment means.

FIGS. 1 and 2 show the matte box and filter assembly secured to the camera and an exploded side view associated with the camera. By combining as many ring bodies as required for the particular camera session, it can be seen that the photographer can place a many ring bodies in series as he desires to accommodate as many filters as desired for the particular session. It can also be seen from FIGS. 1 and 2, that the design of applicant's matte box and filter assembly, is designed for attachment to the camera on the bottom base of the camera. In this configuration, the matte box and filter assembly can be used in a hand-held position or mounted on a tripod. It is also desirable to permit the assembly to be mounted to the top of the camera for ease in transportation, carrying, and use in certain instances when the camera is to be used in a hand-held mode. This may occur in many instances with respect to video cameras which are operated while being held at shoulder height. Applicant's device can be easily adapted to the top mounting on a camera through the use of an adaptor device 300, FIGS. 18 and 19, which comprises two longitudinal securing blocks 302 and 304. Longitudinal securing blocks 302 and 304 have opposed longitudinal V-shaped grooves 306 and 308 respectively in order that longitudinal securing blocks 302 and 304 may be fit over the handle 309 of the camera on its top end, and secured by a series of set screws 310. This in turn would be secured to camera plate 30 by means of a threaded fastener 311 or the like. In this configuration, the entire matte box and filter assembly would extend forwardly from the camera, but depend downwardly in order to align the various ring bodies and filters. A levelly thumbscrew 311 can be positioned in either securing block 302 or 304 as shown to adjust the alignment of the assembly. This could be accomplished by either a single or multiple leveling thumbscrews. Additionally, an adaptor handle can be secured to permit the operator to carry the camera and the attached matte box filter assembly with one hand.

While the above matter describes and illustrates the preferred embodiment of the invention, it should be understood that the invention is not restricted solely to the described embodiments, but that it covers all modifications which should be apparent to one skilled in the art which would fall within the scope and spirit of the invention.

I claim:

1. A matte box and filter assembly for a camera having a lens comprising:
   a mounting frame connected to and supported from said camera extending forwardly of said lens, said mounting frame slidably mounted to said camera and selectively securable by means of set screws, the slidable disposition of said camera being limited by a backstop on said mounting frame and a slidably adjustable front stop, said mounting frame having a junction box positioned forward of said front stop, said junction box comprising a first section and a second section slidably dove-tailed together to permit lateral disposition of said junction box;
   a light shield means for engaging said lens, a matte box means for shielding the light entering said lens, supported by said mounting frame, a plurality of interchangeable filter assemblies selectively positioned between said light shield means and said matte box means, said plurality of filter assemblies comprising a back ring, ring body, ring cover, and front ring cover, engaged in series between said light shield means and said matte box means to permit a combination of plurality of filters, said filter assemblies interconnected with successive filter assemblies selectively rotatable with each other, said plurality of filters selectively slidable perpendicular to the axis of said lens, said filter assemblies rotatably secured by means of an annular groove and coupling screws to aid rotation and perpendicular disposition of each of such filters adjustable by means of a single adjustment means for each such filter.

2. A matte box and filter assembly in accordance with claim 1 wherein said junction box positioned forward of said front stop comprises a first section and a second section slidably dove-tailed together to permit lateral disposition of said junction box to accommodate said camera and said lens when said lens is offset from the central axis of said camera.

3. A matte box and filter assembly in accordance with claim 1 wherein said mounting frame provides support means for adjustably positioning the height of said light shield means and said filter assemblies to accommodate said lenses of said camera of varying heights.

4. A matte box and filter assembly in accordance with claim 1 wherein said mounting frame comprises a fork assembly secured to said junction box and extending forwardly of said junction box, said fork assembly for supporting and securing said matte box means for shielding light entering said lens.

5. A matte box and filter assembly in accordance with claim 1 wherein said filter assembly comprises said back ring, said ring body, said ring cover, and said front ring, engaged in series, each having a centrally-disposed aperture defining a light passageway in alignment with the axis of said lens, said ring body and ring cover rotatably secured to accommodate a filter in rotatable and lateral disposition to said axis of said lens, said rotational and lateral adjustment secured by said adjustment means frictionally engageable with said adjacent ring body and a filter holder.

6. A matte box and filter assembly in accordance with claim 5 wherein said back ring is threadedly secured to said light shield means.

7. A matte box and filter assembly in accordance with claim 6 wherein said ring body and ring cover are secured together to define a rectangular channel to accommodate said filter.

8. A matte box and filter assembly in accordance with claim 7 wherein said ring body and ring cover are rotatably secured to said back ring by means of a circumferential groove on said ring body to permit the selective rotation thereof by means of ring coupling screws engaged in said circumferential groove.

9. A matte box and filter assembly in accordance with claim 8 wherein successive ring bodied secured in series are independently rotatable with adjacent ring bodies by means of cooperative circumferential grooves and ring coupling screws in said ring bodies and said ring covers.

10. A matte box and filter assembly in accordance with claim 9 wherein said ring body and ring covers are secured in series to accommodate a plurality of filters rotatably and perpendicularly slidably aligned with said axis of said lens.

11. A matte box and filter assembly in accordance with claim 10 wherein said filters are removably secured within said filter holder slidably accommodated in said rectangular channel of said ring body and ring cover, said filter holder having resilient vertical longitudinal indents on opposing longitudinal edges.

12. A matte box and filter assembly in accordance with claim 11 wherein said rotation and said slidable perpendicular disposition of said filter and said filter holder in relation to said axis of said lens is controlled by said single adjustment means, said adjustment means comprising a frictionally engageable thumbscrew positioned on the annular edge of said ring body simultaneously engageable with said resilient indent on said filter holder and adjacent ring body so as to selectively secure each said filter holder in rotatable and slidable perpendicular disposition to said axis of said lens.

* * * * *